United States Patent
Sheriff et al.

(10) Patent No.: US 6,170,619 B1
(45) Date of Patent: Jan. 9, 2001

(54) MANUAL HAND BRAKE SENSOR FOR A RAILROAD CAR

(75) Inventors: Alan V. Sheriff; Brady J. Hammond; Duane J. Sies; Gary R. O'Brien; Brad L. Cummins, all of Freeport, IL (US)

(73) Assignee: Honeywell INC, Morristown, NJ (US)

( * ) Notice: Under 35 U.S.C. 154(b), the term of this patent shall be extended for 0 days.

(21) Appl. No.: 09/182,381

(22) Filed: Oct. 29, 1998

(51) Int. Cl.⁷ .................................................... F16D 65/14
(52) U.S. Cl. ................. 188/107; 188/1.11 R; 246/167 R
(58) Field of Search ........................ 188/107, 1.11 R; 303/7, 20; 246/167 R, 182 R, 182 A, 182 B; 116/28 R, 30, 55

(56) References Cited

U.S. PATENT DOCUMENTS

| 1,491,753 | * | 4/1924 | Sauvage ................................ 188/107 |
| 4,368,927 | * | 1/1983 | Billingsley et al. ..................... 303/18 |
| 4,552,412 |   | 11/1985 | Balukin et al. . |
| 4,555,120 |   | 11/1985 | Frait et al. . |
| 4,904,027 |   | 2/1990 | Skantar et al. . |
| 4,972,145 | * | 11/1990 | Wood et al. ......................... 324/160 |
| 5,286,096 |   | 2/1994 | Ferri et al. . |
| 5,415,379 |   | 5/1995 | Hoyt et al. . |
| 5,469,941 | * | 11/1995 | Horvath ............................... 188/107 |
| 5,528,948 |   | 6/1996 | De Gelis . |
| 5,632,367 |   | 5/1997 | Bergeron et al. . |

\* cited by examiner

*Primary Examiner*—Robert J. Oberleitner
*Assistant Examiner*—Pamela J. Rodriguez
(74) *Attorney, Agent, or Firm*—Roland W. Norris; Andrew A. Abeyta

(57) ABSTRACT

On a railroad car handbrake system the main handbrake shaft, used to turn the chain, is utilized during its rotation to drive a target object to a magnetic sensor. The target object may be driven by cam plates, gears, screw mechanisms or the like and may be a magnetic or ferromagnetic object. The sensor system disclosed is rugged and easily adapted to existing handbrake systems.

18 Claims, 5 Drawing Sheets

MANUAL HAND BRAKE SENSOR FOR A RAILROAD CAR

BACKGROUND OF THE INVENTION

1. Field of the Invention

This invention relates to sensors capable of distinguishing when the manual hand brake setting apparatus of a railroad car is in the "Off" or "Brake Release" position.

2. Description of the Related Art

The rail industry has a very high maintenance cost related to wheel damage. The majority of this damage is the result of handbrakes being left on prior to a train departing the rail yard. If a car has the handbrake left on when the train begins to move, the wheels of that car will not turn, resulting in a worn, flat spot on the wheel. The handbrake being left on can also result in a derailment if not detected prior to the train leaving the rail yard. For these reasons it is desirable to provide the manual handbrake setting apparatus of a railcar with a sensor having an indication means whereby the railroad operator is able to determine that the manual setting of the brakes is placed in the "off" position before moving the train.

It is well known in the art of railroad car building to equip railcars with a manual brake system which is actuated by a manually turned wheel located on the front, or back, of said car. Generally the wheel is attached through gearing to an axle which is attached to a chain running down the front of the car and generally to the undercarriage of said car where the chain is linked to the brake rigging. Turning of the wheel gathers the chain, putting it in tension, whereby the brakes, i.e. brake pads, are pulled into the wheel assembly. Release of the chain to sufficient slack where it will not tighten and engage the brakes under any conditions, such as the rail car tilting when going around curves etc., is accomplished by turning the wheel in the opposite direction, or pulling a release arm, to unwind chain from the main axle.

Because the railroad car will often be subject to extremes of environment including temperature, dirt, water, and the like it is further very desirable that the sensor have a rugged construction unlikely to be susceptible to environmental degradation. It is further desirable that the sensor be located on the railroad car where it is least likely to be susceptible to such environmental degradation or contamination.

SUMMARY OF THE INVENTION

By utilizing the rotation of the main shaft, which gathers the brake chain, to drive a target object toward a sensor located near the main shaft; sensing of the chain position can be accomplished and the railroad operator can be notified when the brakes are, or should be, in the released position. An indicator electrically connected to the sensor will of course be utilized to provide some operator interface to notify the train operator.

Preferably, a magnetically sensitive sensor able to detect shifts in magnetic field caused by a magnetic or ferromagnetic target are utilized since such sensors are highly resistant to environmental contamination or degradation. Other environmentally rugged sensors such as a proximity sensor may be substituted for the magnetically sensitive sensor. The target object to be sensed may be driven by a variety of means linked to the main shaft such as cam plates, gears, screw mechanisms or the like. The present invention is further easily adapted to present hand brake systems, requiring minimal amounts of retrofitting.

BRIEF DESCRIPTION OF THE DRAWINGS

The present invention will be more fully and completely understood from a reading of the Description of the Preferred Embodiment in conjunction with the drawings, in which.

DESCRIPTION OF THE PREFERRED EMBODIMENT

Figure 1:
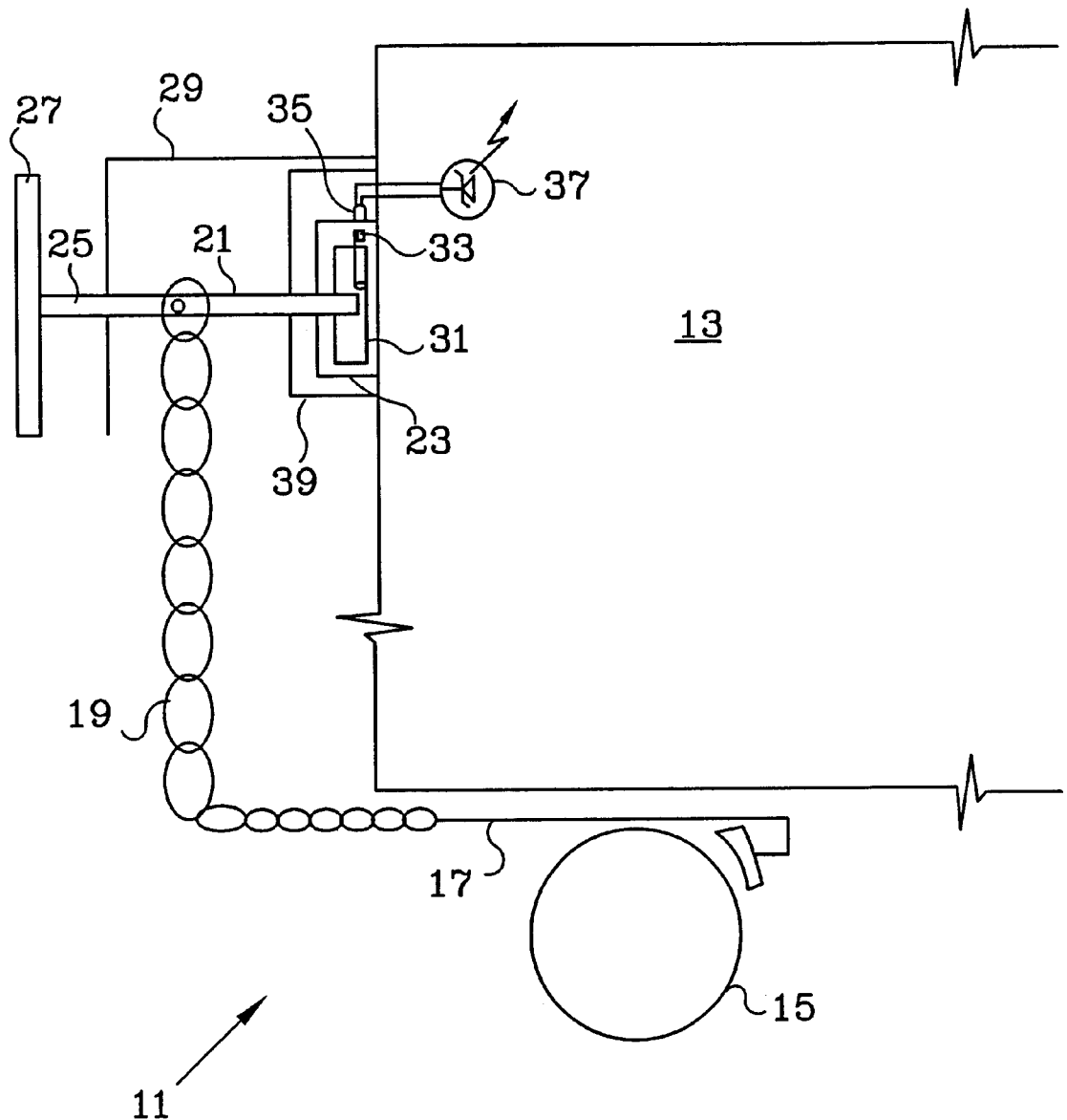
FIG. 1 is a highly schematic view of a railroad car showing a handbrake setting system commonly in use and a highly schematic indication of the present invention therewith.

Throughout the Description of the Preferred Embodiment, like components will be identified by like reference numerals.

As seen in FIG. 1, a railcar 11 (front end) has a body 13 mounted on a carriage assembly, or trucks (not shown), which carry the wheels 15 and the brake linkage 17. A manual system for engaging the brake linkage 17 includes a chain 19 which is attached to a main shaft 21 which is rotatably affixed to the car body 13 by a bearing 23 near the car body 13. At the outboard end 25 of the main shaft 21 is located a hand wheel 27 for manual rotation of the main shaft 21 in order to put the chain in tension or slack. Hand wheel 27 is turned to gather the chain 19 about the main shaft 21 and thus put the chain in tension thereby engaging the brake linkage 17 to set the brakes against wheels 15. Normally a cover 29 is provided for the journaled end of the main shaft 21 and the gathered chain to provide some environmental protection therefor.

According to the present invention, as shown highly schematically in FIG. 1, a drive means 31 such as a cam plate or the like, is attached to the main or central shaft 21 and in turn drives a target 33 towards a sensing element 35. When target 33 is placed within the sensitivity range of the sensor 35 the position of the main shaft 21 with respect to its operation of the brake chain 19 is therefore determined. Normally the most critical piece of information for the railroad operator is that the brakes are off when the train is placed under motive force. Therefore it is this condition which is most preferably sensed. The sensor 35 is then connected to suitable output electronics and operator interface indication means 37, schematically illustrated by an LED in FIG. 1, although many forms of operator interface will be apparent to the ordinarily skilled artisan. A cover 39 is then preferably provided to protect the sensing apparatus of the present invention including the drive means, the target, and the sensor from environmental contamination or degradation.

Some common parts of the brake mechanism and railroad car assembly have been left out for purposes of clarity of explanation but will be recognized by the ordinarily skilled artisan of railroad car construction and are not deemed necessary to a further exposition of the present invention.

Figure 2:
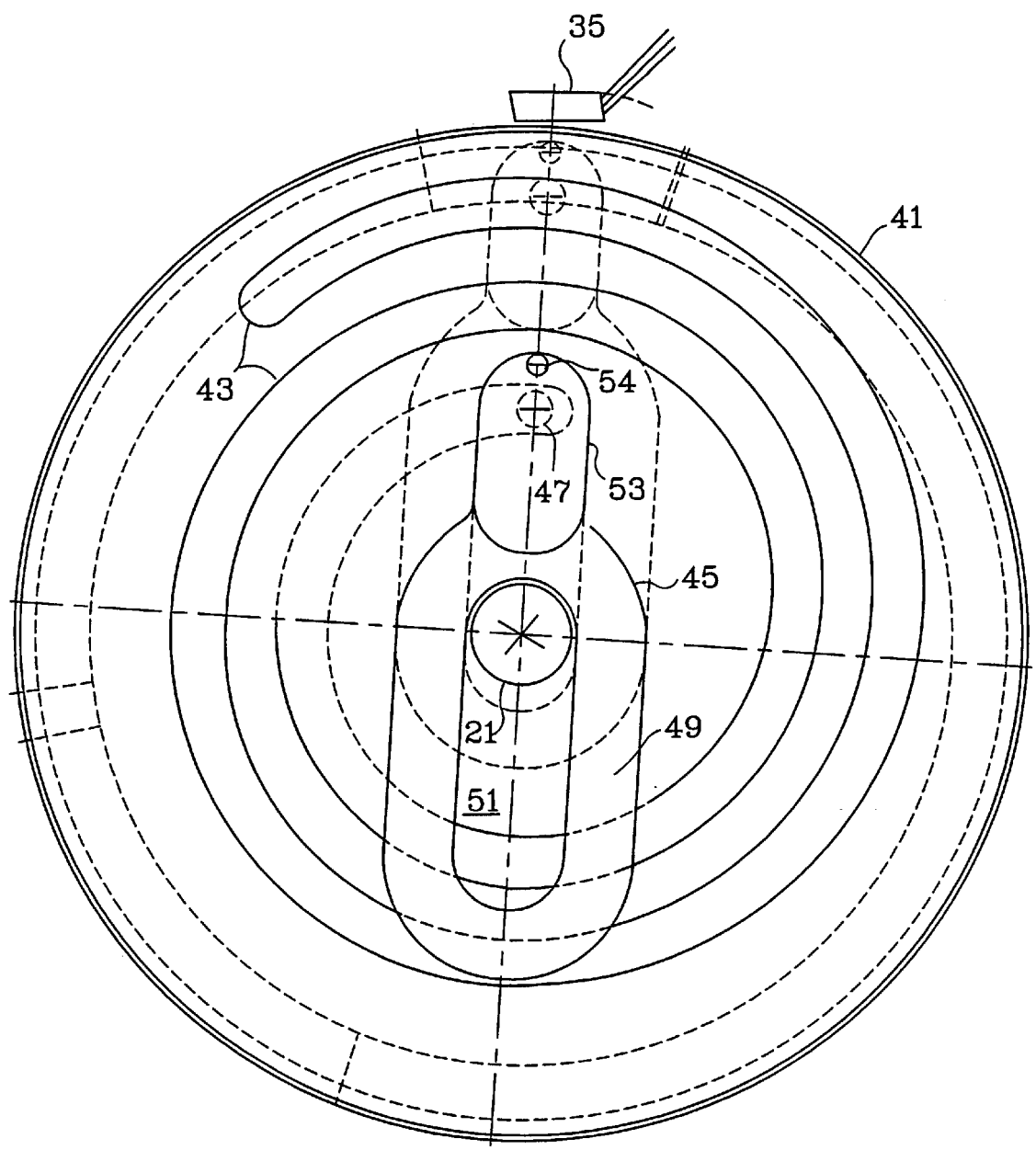
FIG. 2 is a detail of a first embodiment of the present invention.

Referencing FIG. 2, the main shaft 21 has affixed concentrically therewith a cam wheel 41 having a spiral groove or track 43 therein for the provision of camming action. A cam follower 45 is affixed within the spiral track 43 at one end thereof by a pin 47. The cam follower 45 is prevented from rotating by a grooved cover or the like (not shown). The cam follower 45 is shown as an elliptical ring 49 whose center void 51 overlies the main shaft 21. An elongated member 53 carrying the pin 47 is affixed at one end of the elliptical ring 49 in order to provide connection to the spiral track 43. A sensor such as a magnetically sensitive Hall element sensor or the like 35 is located in a fixed position outside of the cam wheel 41 such that rotation of the main shaft 21 in turn causes rotation of the cam wheel 41, drawing the cam follower 45 towards the sensor 35. The cam follower is preferably constructed of ferromagnetic material or may have a feature thereon such as a magnet 54 for disturbing the field of the Hall sensor 35. The cam follower 45 is shown in phantom placed in position to be sensed by the sensor 35. The sensing apparatus of FIG. 2 might be constructed and arranged as an end cap addition to the main shaft wherein, e.g. the cam wheel 41 is approximately the same diameter as the shaft itself, thereby making the sensing apparatus very compact.

Figure 3:
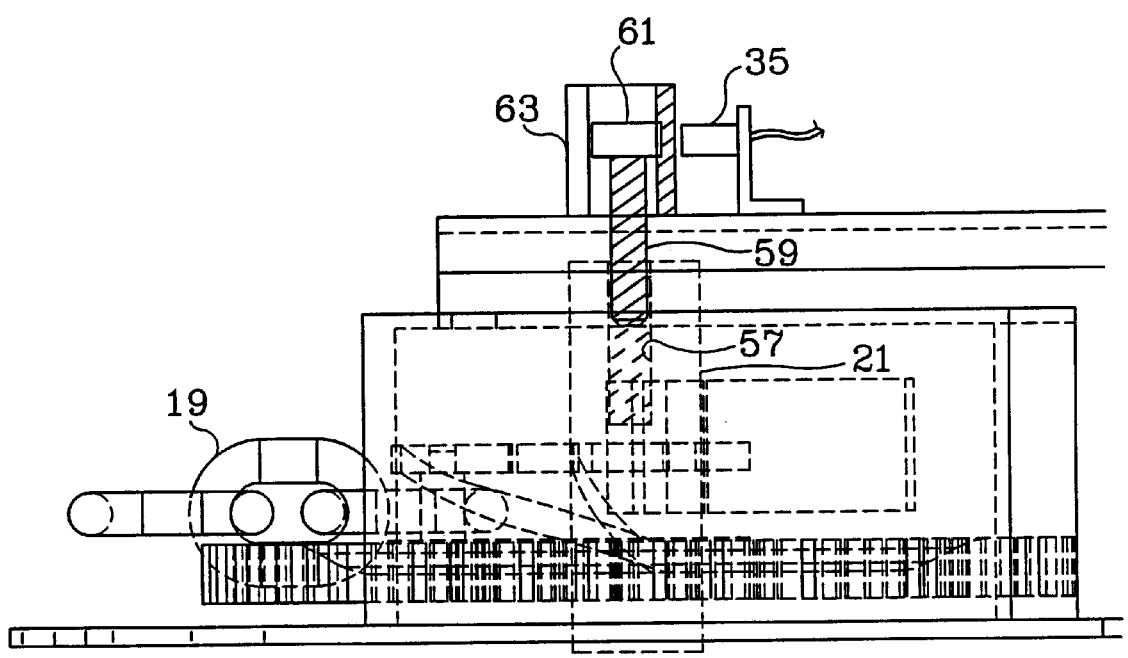
FIG. 3 is a detail of a second embodiment of the present invention.

Referencing FIG. 3, a second embodiment shows the main shaft 21 with a threaded central bore 57 at either the rear or front end thereof, i.e. proximal or distal to the car. Riding within the threaded central bore 57 is a screw, or threaded member, 59 with a square or rectangular head 61 captivated in a housing 63 attached over the end of the main shaft 21. Turning of the main shaft will cause the screw 59 to ride up and down within the threaded central bore 57, presenting the rectangular head 61 to the magnetic sensor 35. The sensor is affixed to sense the screw head 61 at its extended position where the main shaft is in position to provide sufficient slack to the brake chain 19. The housing, or screw head holder 63 may have an opening or slot (not shown) placed therein at point where the screw head 61 reaches the sensitivity range of the sensor 35 in order that the screw head holder 63 does not interfere with the magnetic interaction between sensor 35 and screw head 61.

The sensing apparatus of FIG. 3 might desirably be constructed and arranged as an end-cap add-on to the main shaft rather than having a threaded bore within the main shaft as shown.

Figure 4:
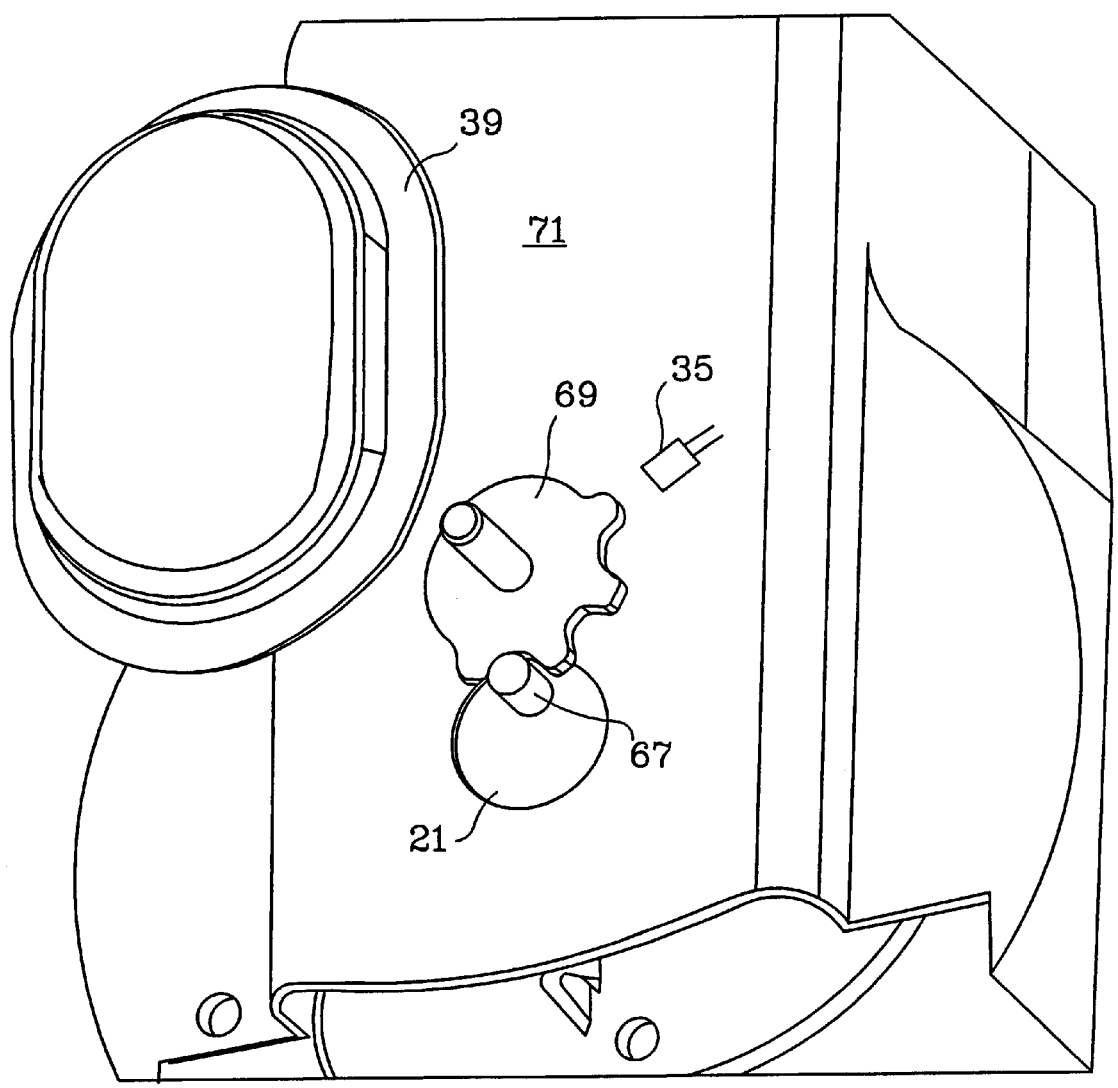
FIG. 4 is a detail of a third embodiment of the present invention.

Referencing FIG. 4, a third alternative of the preferred embodiment shows the main shaft 21 having on its back end (closest to the car) an eccentric pin 67. The eccentric pin 67 engages a partially toothed gear wheel 69 rotatably affixed to the back of main shaft bearing housing 71. Rotation of the main shaft 21 will cause the eccentric pin 67 to engage a tooth of the partially toothed gear wheel 69 once per revolution of the main shaft thus rotating one tooth, or a feature thereon, or a lack of teeth, toward the sensor 35 to determine the appropriate position of the main shaft 21 in a position where sufficient slack is given the brake chain (not shown) to release the manual actuation of the brakes. A cap 39 is preferably provided to prevent environmental contamination and degradation of the sensing apparatus.

Figure 5:
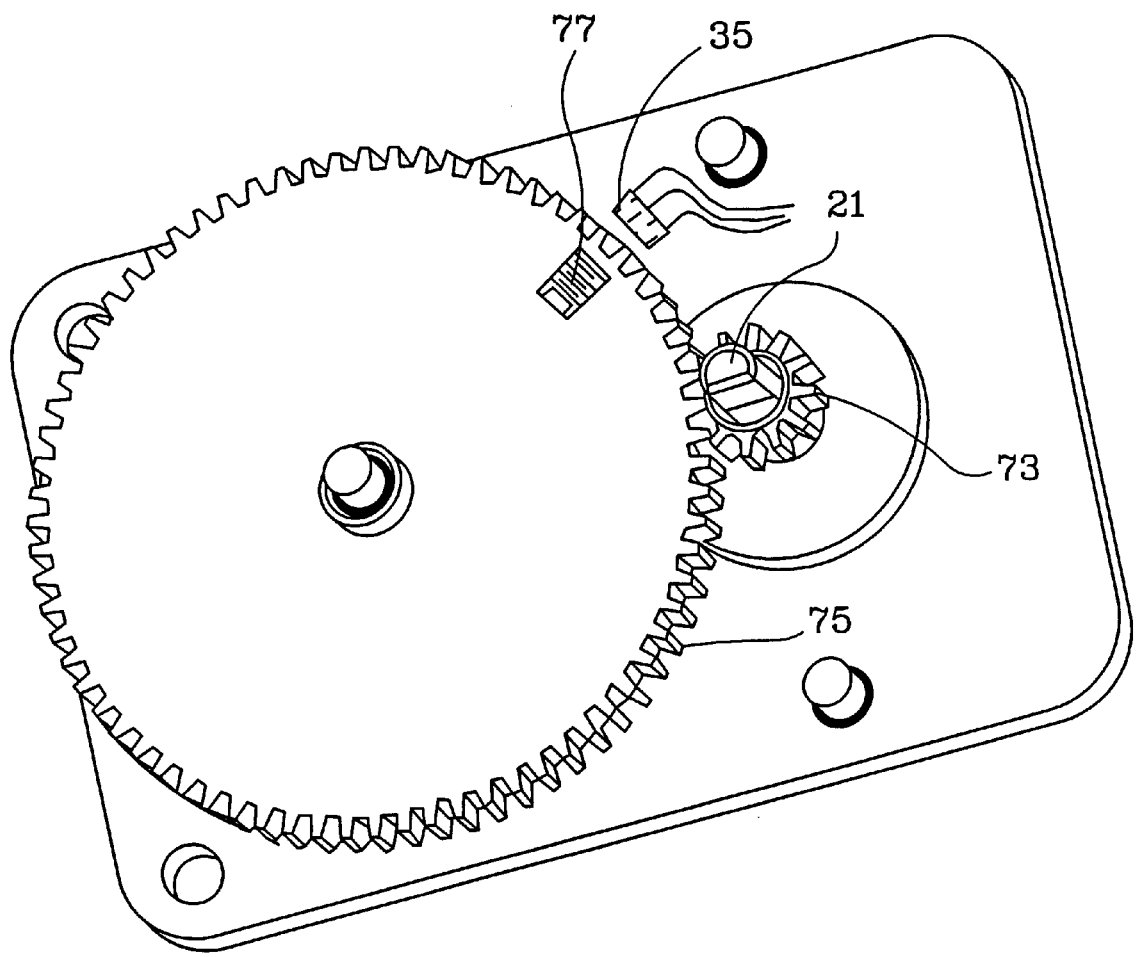
FIG. 5 is a detail view of a fourth embodiment of the present invention.

Referencing FIG. 5, a fourth alternative embodiment shows the main shaft 21, or suitable extension thereof, having affixed concentrically thereto a drive gear 73. The drive gear 73 engages a driven gear 75 with a magnet or other ferromagnetic-magnetic feature 77 mounted thereon. A Hall sensor 35 is fixedly located on the apparatus so as to be placed where its sensitivity range will detect the magnet 77 which is placed to be aligned with the sensor 35 when the main shaft 21 is placed in position to allow sufficient chain slack for the brakes to be fully off. Commonly, five full rotations of the main shaft 21 are required to fully tension or slack the chain placing the brakes from full on to full off respectively. Thus the driven gear 75 shown in FIG. 5 is selected to have a reduction ratio of 5:1 with the driving gear 73.

All of the above embodiments may be suitably constructed and arranged to provide a low profile environmentally rugged sensing apparatus for main shaft chain release position and would require minimal rework or retrofitting to existing brake mechanisms.

Although several alternative embodiments have been shown, numerous variants will occur to the artisan of ordinary skill in the art of sensing apparatus and the present invention is intended to be limited only by the claims herein.

Having thus described the invention what is claimed is:

1. A railroad car handbrake sensor assembly for the type of handbrake having a chain placed in tension by a main shaft to set the railroad car brakes, respectively, comprising:

a) a drive means attached to the main shaft;

b) a target movable by the drive means;

c) a sensor capable of sensing the target when the target is within a sensitivity range of the sensor;

d) the drive means being constructed and arranged to place the target in the sensitivity range of the sensor when the central shaft is turned to a position where the chain is unwound therefrom.

2. The handbrake sensor of claim 1 wherein:

the drive means is a cam plate affixed concentrically to the main shaft.

3. The handbrake sensor of claim 2 wherein:

the target is one of a cam follower moved by the cam plate or a feature attached to the cam follower.

4. The handbrake sensor of claim 3 wherein;

the sensor is located outboard of the cam plate at a fixed location radially outward from the axis of the main shaft.

5. The handbrake sensor of claim 1 wherein:

the drive means includes a screw and a threaded bore concentric with the main shaft, the threaded bore having threads matable with the screw, the drive means further including a means for captivating the screw to prevent common rotation of the screw and the main shaft.

6. The handbrake sensor of claim 5 wherein:

the target is one of a head of the screw or a feature attached thereto.

7. The handbrake sensor of claim 6 wherein the sensor is located axially outward along the axis of the main shaft.

8. The handbrake sensor of claim 1 wherein:

the drive means is a pin affixed eccentrically onto an end of the main shaft.

9. The handbrake sensor of claim 8 wherein:

the target is one of a partially toothed gear wheel or a feature attached thereto.

10. The handbrake sensor of claim 8 wherein:

the drive means further includes a partially toothed gear wheel.

11. The handbrake sensor of claim 10 wherein:

the sensor is located radially outward from the axis of the partially toothed gear wheel.

12. The handbrake sensor of claim 1 wherein:

the drive means includes a drive gear affixed concentrically to the main shaft and a driven gear in communication therewith.

13. The handbrake sensor of claim 12 wherein:
the target is one of a magnet or ferromagnetic feature affixed to the driven gear.

14. The handbrake sensor of claim 13 wherein:
the sensor is located radially outward from the axis of the driven gear and outboard of the driven gear.

15. The handbrake sensor of claim 13 wherein:
the drive gear and driven gear have a ratio of less than or equal to 1:5.

16. The handbrake of claim 1 further comprising:
a means for covering the drive means, target and sensor to protect them from environmental degradation.

17. The handbrake sensor of claim 1 wherein:
the sensor is a Hall effect sensor.

18. The handbrake sensor of claim 1 wherein:
the sensor is a magneto-resistive sensor.

* * * * *